United States Patent
Oh et al.

(10) Patent No.: US 12,024,089 B2
(45) Date of Patent: Jul. 2, 2024

(54) APPARATUS AND METHOD OF REALIZING VIRTUAL AFTER-BURN EFFECT IN ELECTRIC VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Dong Chul Park, Anyang-si (KR); Jeong Soo Eo, Hwaseong-si (KR); Tae Kun Yun, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 584 days.

(21) Appl. No.: 17/197,543

(22) Filed: Mar. 10, 2021

(65) Prior Publication Data
US 2022/0089085 A1 Mar. 24, 2022

(30) Foreign Application Priority Data
Sep. 22, 2020 (KR) .................. 10-2020-0121971

(51) Int. Cl.
*B60Q 5/00* (2006.01)
*B60W 50/16* (2020.01)

(52) U.S. Cl.
CPC ............ *B60Q 5/008* (2013.01); *B60W 50/16* (2013.01); *B60W 2510/083* (2013.01); *B60W 2510/087* (2013.01); *B60W 2540/10* (2013.01); *B60Y 2306/11* (2013.01)

(58) Field of Classification Search
CPC ....... H04B 1/082; B60Q 5/008; B60W 50/16; B60W 2510/083; B60W 2510/087; B60W 2540/10; B60Y 2306/11; B60Y 2200/91; H02K 11/33; H02P 23/30
See application file for complete search history.

(56) References Cited

U.S. PATENT DOCUMENTS

| | | | |
|---|---|---|---|
| 10,766,479 B2 * | 9/2020 | Galang | B60W 10/06 |
| 10,807,600 B2 * | 10/2020 | Jordan, III | B60K 35/00 |
| 10,906,557 B1 * | 2/2021 | Aunkst | B60W 50/16 |
| 2008/0060861 A1 * | 3/2008 | Baur | B60K 1/00 180/65.6 |
| 2013/0114827 A1 * | 5/2013 | Lee | B60Q 5/008 381/86 |

(Continued)

FOREIGN PATENT DOCUMENTS

| KR | 20120077630 A | * | 7/2012 | ............. | B60Q 5/001 |
| KR | 20120077630 A | * | 7/2017 | ............. | B60Q 5/001 |

*Primary Examiner* — Oyesola C Ojo
(74) *Attorney, Agent, or Firm* — MORGAN, LEWIS & BOCKIUS LLP (57) ABSTRACT

An apparatus and method of realizing a virtual after-burn effect of a vehicle are provided. The method includes receiving vehicle driving information at a controller while the electric vehicle travels, determining, by the controller, characteristics of the virtual after-burn effect based on the input vehicle driving information, outputting, by the controller, a control signal for realizing the virtual after-burn effect based on the determined characteristics of the virtual after-burn effect, and controlling, by the controller, an operation of a realization device for realizing the virtual after-burn effect according to the control signal.

16 Claims, 4 Drawing Sheets

---

INPUT PARAMETER FOR REALIZING VIRTUAL AFTER-BURN EFFECT

- INPUT AND COLLECT ACCELERATOR PEDAL INPUT INFORMATION, DRIVING SYSTEM SPEED INFORMATION, AND PE PART TEMPERATURE INFORMATION

↓

DETERMINE CHARACTERISTICS OF VIRTUAL AFTER-BURN EFFECT

- REALIZATION TIME, INTENSITY, FREQUENCY, TIME DURATION, AND TIME INTERVAL OF VIRTUAL AFTER-BURN EFFECT

↓

REALIZE VIRTUAL AFTER-BURN EFFECT

- REALIZE SOUND EFFECT AND VIBRATION EFFECT, AND LIGHT-EMITTING EFFECT

(56) References Cited

U.S. PATENT DOCUMENTS

| | | | |
|---|---|---|---|
| 2015/0151680 A1* | 6/2015 | Park | B60Q 5/008 |
| | | | 381/86 |
| 2016/0046234 A1* | 2/2016 | Kim | G10K 15/02 |
| | | | 381/86 |
| 2016/0052448 A1* | 2/2016 | Lee | G10K 1/074 |
| | | | 116/37 |
| 2016/0118037 A1* | 4/2016 | Yun | G10K 11/17873 |
| | | | 381/71.4 |
| 2016/0152183 A1* | 6/2016 | Kim | B60Q 11/00 |
| | | | 381/58 |
| 2016/0311368 A1* | 10/2016 | Lee | G10K 15/04 |
| 2017/0129397 A1* | 5/2017 | Gee | B60Q 5/008 |
| 2017/0151907 A1* | 6/2017 | Sakamoto | G10K 15/02 |
| 2018/0178719 A1* | 6/2018 | Min | G08G 1/166 |
| 2019/0111839 A1* | 4/2019 | Lee | B60Q 9/00 |
| 2019/0385584 A1* | 12/2019 | Han | G10K 11/17823 |
| 2019/0392811 A1* | 12/2019 | Lee | H04R 3/00 |
| 2021/0053487 A1* | 2/2021 | Vangelov | B60W 50/10 |

\* cited by examiner

APPARATUS AND METHOD OF REALIZING VIRTUAL AFTER-BURN EFFECT IN ELECTRIC VEHICLE

CROSS-REFERENCE TO RELATED APPLICATION

The present application claims priority to and the benefit of Korean Patent Application No. 10-2020-0121971 filed on Sep. 22, 2020, the entire contents of which are incorporated herein by reference.

TECHNICAL FIELD

The present disclosure relates to an apparatus and method of realizing a virtual after-burn effect in an electric vehicle, and more particularly to an apparatus and method of realizing a virtual after-burn effect depending on a driving condition of a vehicle in an electric vehicle without an internal combustion engine.

BACKGROUND

As is known, an electric vehicle (EV) travels using a motor as a source of driving power for driving a vehicle.

A driving system of an EV includes a battery for supplying power for driving a motor, an inverter connected to the battery and for driving and controlling the motor, the motor connected to the battery to be charged and discharged through the inverter as a driving source of the vehicle, and a reducer for reducing rotation power of the motor and transferring the reduced rotation power to a driving wheel.

Here, the inverter charges the battery by converting direct current (DC) supplied from the battery into alternating current (AC) and applying the AC to the motor through a power cable during driving of the motor, and converting AC generated by the motor operating as a generator into DC and supplying the DC to the battery during regeneration of the motor.

The aforementioned driving system of the EV generates power by driving the motor using power of the battery rather than generating power by burning fuel like a conventional internal combustion engine vehicle.

Accordingly, torque of an EV is generally delicate and smooth and has high reactivity compared with torque of an internal combustion engine, unlike torque of the internal combustion engine, generated by an aerodynamic and thermodynamic reaction.

Such characteristics act as positive part in an EV but, in the case of a high-performance vehicle, various effects generated due to the noise, physical vibration, and thermodynamic action of an internal combustion engine may be rather emotionally important.

One of factors that are not capable of being provided by an EV due to the characteristics thereof is an after-burn sound that a driver often experiences in a high-performance internal combustion engine vehicle and backfire that occurs due to the after-burn sound.

The after-burn sound is a sound generated due to a pressure change in an exhaust system of an internal combustion engine and is generated while dense fuel expands in a high-temperature pipe when discharged through an exhaust manifold in the state in which the fuel is not ignited in a cylinder of an engine for various reasons in a high-performance vehicle or the like.

The after-burn sound may allow a vehicle occupant such as a driver to experience dynamic driving sensation and excitement, and accordingly there is a need for technology for virtualizing an after-burn effect in an EV, like in an internal combustion engine vehicle.

SUMMARY

In one aspect, the present disclosure provides an apparatus and method of realizing a virtual after-burn effect of a vehicle for realizing a virtual after-burn effect according to a driving condition of the vehicle in an electric vehicle without an internal combustion engine.

In a preferred embodiment, a method of realizing a virtual after-burn effect in an electric vehicle includes inputting vehicle driving information to a controller while the electric vehicle travels, determining, by the controller, characteristics of the virtual after-burn effect based on the input vehicle driving information, outputting, by the controller, a control signal for realizing the virtual after-burn effect based on information on the determined characteristics of the virtual after-burn effect, and controlling, by the controller, an operation of a realization device for realizing the virtual after-burn effect according to the output control signal.

In another aspect, an apparatus for realizing a virtual after-burn effect in an electric vehicle includes a driving information detector configured to detect vehicle driving information while the electric vehicle travels, a controller configured to determine characteristics of the virtual after-burn effect based on the vehicle driving information detected by the driving information detector and to output a control signal for realizing the virtual after-burn effect based on information on the determined characteristics of the virtual after-burn effect, and a realization device installed in the electric vehicle and configured to control an operation to realize the virtual after-burn effect according to the control signal output by the controller.

DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Exemplary embodiments of the present disclosure are described in detail with reference to the accompanying drawings so that those of ordinary skill in the art may easily implement the disclosure. However, the present disclosure may be implemented in various different forms, and is not limited to these embodiments.

In the specification, when a certain part is said to "include" a certain component, this indicates that the part may further include another component, rather than necessarily excluding the other component, unless there is a disclosure to the contrary.

The present disclosure provides an apparatus and method for realizing and embodying a virtual after-burn effect according to a vehicle driving condition in an electric vehicle (EV) without an internal combustion engine.

According to the present disclosure, realization of the virtual after-burn effect may include visual realization for representing an effect of light-emitting mimicking backfire as well as acoustic realization for playing an auditory realization effect mimicking after-burn sound and may further include realization of vibration generated due to after-burn.

Figure 1:
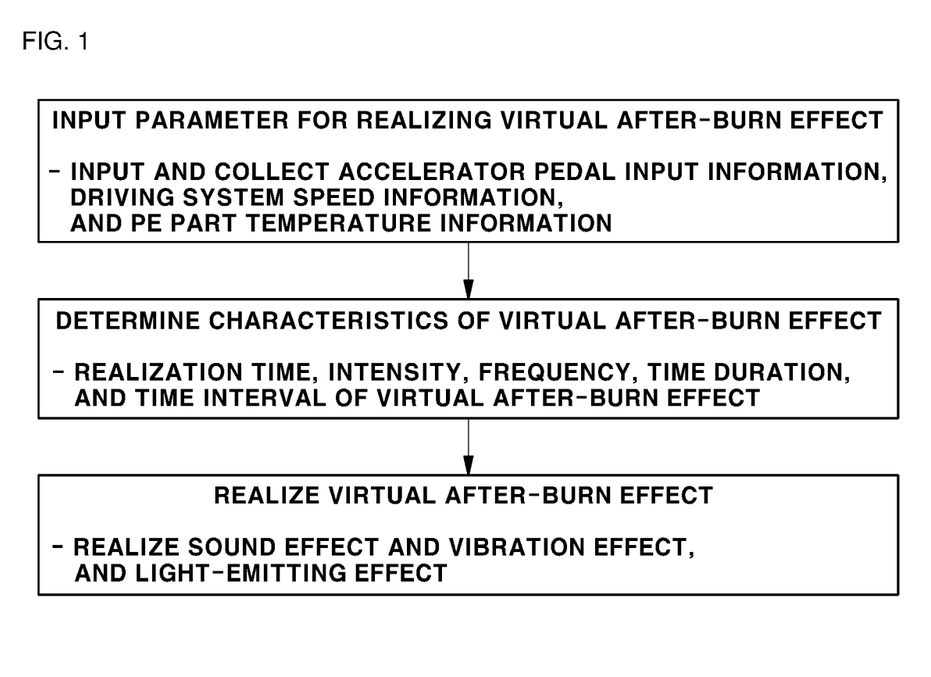
FIG. 1 is a block diagram of a method of realizing a virtual after-burn effect in one form of the present disclosure.

FIG. 1 is a block diagram of a method of realizing a virtual after-burn effect in some forms of the present disclosure.

According to the present disclosure, parameter information for realizing a virtual after-burn effect while a vehicle travels may be collected in real time, the characteristics of the virtual after-burn effect may be determined in real time based on the collected parameter information, and then the virtual after-burn sound may be output through a speaker according to information on the determined characteristics of the virtual after-burn effect (sound effect realization), and vehicle vibration and backfire due to after-burn may be realized through a vibration device and a light-emitting device (vibration effect and light-emitting realization).

According to the present disclosure, the parameter information as input information that is input and used in a controller in order to generate and realize the virtual after-burn effect may be vehicle driving information, and the vehicle driving information may include driver input information and driving state information.

The vehicle driving information may be sensor detection information that is detected by a sensor and is input through a network in a vehicle, information determined by the controller according to the present disclosure, or information that is input to the controller according to the present disclosure through the network in the vehicle from another controller in the vehicle.

In detail, the vehicle driving information may include at least one of an accelerator pedal input value and a change rate (a change inclination) thereof as driver input information, an integrated value of an accelerator pedal input value, motor torque (a motor torque command) and a change rate (a change inclination) thereof as driving state information, an integrated value of motor torque, information on speed of a driving system, and temperature of a power electronic (PE) part.

Here, the accelerator pedal input value may be obtained through accelerator pedal manipulation of a driver and may be information detected by an accelerator pedal detector as described below.

The change rate of the accelerator pedal input value may refer to a change inclination of the accelerator pedal input value (APS value) and may be obtained by calculating an inclination of an accelerator position sensor (APS) signal.

The motor may refer to a driving motor connected to a driving wheel and for driving a vehicle, and the driving motor may be a motor torque command determined by a controller based on the vehicle driving information collected from the vehicle.

The change rate of the motor torque may refer to a change inclination of the motor torque command.

A method of determining and generating a motor torque command for controlling torque output of a driving motor in an electric vehicle and operations of the method are known to one of ordinary skill in the art, and thus a detailed description thereof will be omitted.

The information on speed of a driving system may include one or two of speed and acceleration, and here, the speed may be rotation speed of a part of a vehicle driving system and may be motor speed, wheel speed, or drive shaft speed.

The acceleration may be obtained by differentiating a signal of motor speed, wheel speed, or drive shaft speed or may be an actually measured value measured by an acceleration sensor.

The temperature of the power electronic (PE) part may be detected by a temperature sensor, and here, the PE part may refer to a PE part in an electric vehicle, such as a part of a driving system.

According to the present disclosure, the temperature of the PE part may be temperature of a motor or temperature of a battery, or may be temperature of other PE parts other than the motor and the battery, for example, temperature of an inverter or temperature of other parts of a driving system of a vehicle.

In order to cool power electronic (PE) parts such as a motor, a battery, or an inverter, an electric vehicle may use a water cooling system for circulating a coolant between a radiator and the parts, and temperature of the part may be temperature of a coolant, detected by a temperature sensor.

According to the present disclosure, the controller may determine the characteristics of a virtual after-burn effect based on the vehicle driving information that is actual input information in an electric vehicle, and here, the characteristics of the virtual after-burn effect may include the time when an after-burn effect is realized.

In addition, the characteristics of the virtual after-burn effect may further include at least one of intensity, a frequency, time duration, and a time interval.

Then, according to the present disclosure, as described above, when the characteristics of the virtual after-burn effect are determined, the controller may control an operation of a device for realizing a virtual after-burn effect, included in a vehicle, that is, a sound device such as a speaker or an amplifier for outputting and playing a sound effect, a vibration device for generating and outputting vibration, and a light-emitting device for emitting light in order to acoustically realize an auditory effect, vibration, and a visual effect.

Figure 2:
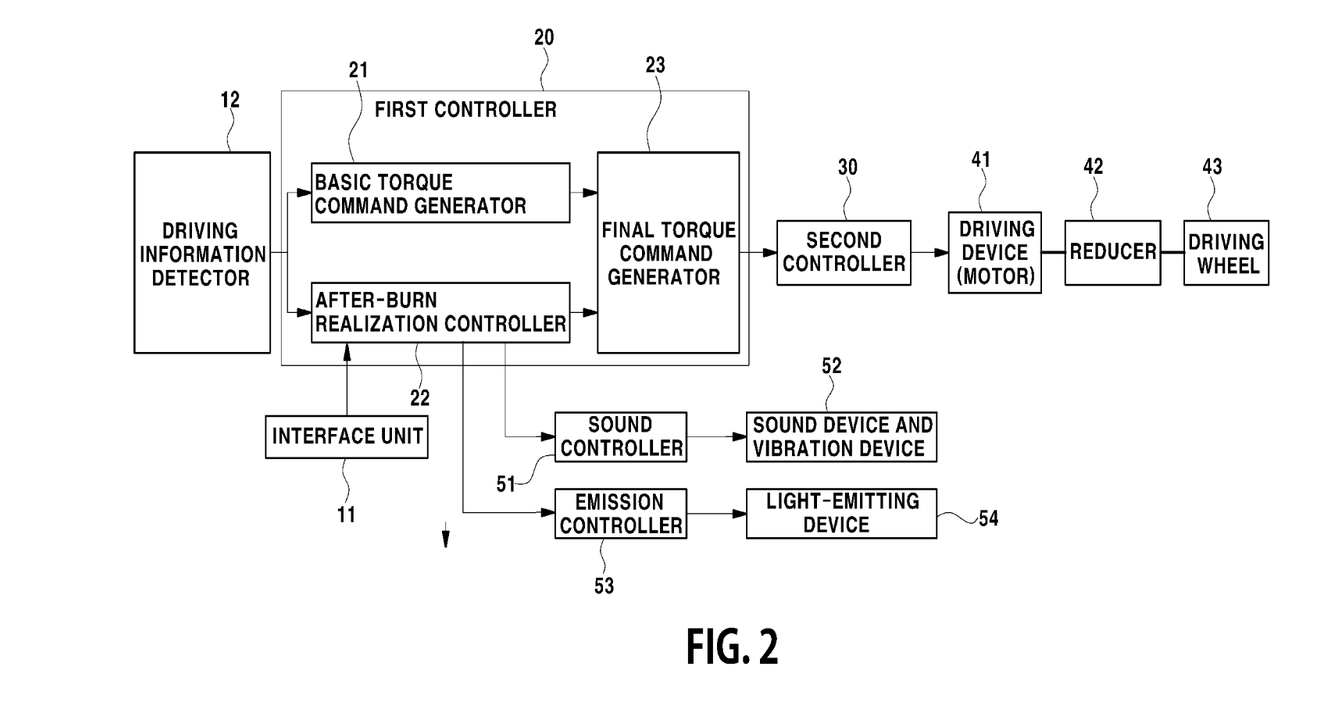
FIG. 2 is a block diagram showing the configuration of an apparatus for realizing a virtual after-burn effect in one form of the present disclosure.
Figure 3:
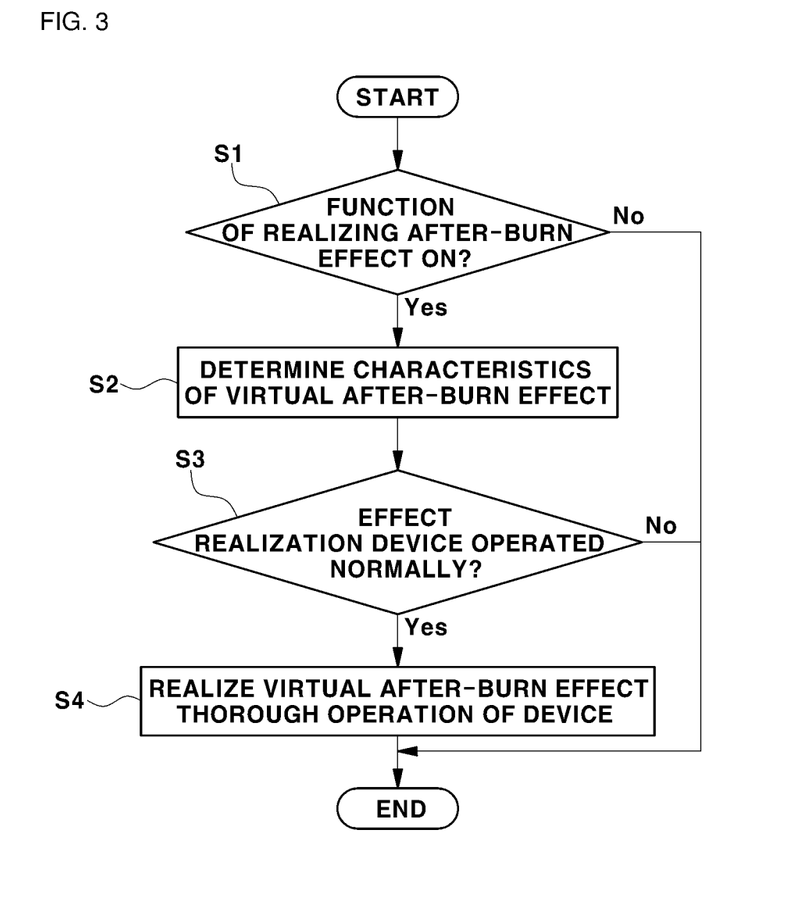
FIG. 3 is a flowchart of an operation of realizing a virtual after-burn effect in one form of the present disclosure.

FIG. 2 is a block diagram showing the configuration of an apparatus for realizing a virtual after-burn effect in some forms of the present disclosure. FIG. 3 is a flowchart of an operation of realizing a virtual after-burn effect in some forms of the present disclosure.

As shown in FIG. 2, the apparatus for realizing a virtual after-burn effect according to an embodiment of the present disclosure may include a driving information detector 12 for detecting vehicle driving information, a first controller 20 for generating and outputting a torque command based on the vehicle driving information detected by the driving information detector 12, and a second controller 30 for controlling an operation of a driving motor 41 according to the torque command output by the first controller 20.

The apparatus for realizing a virtual after-burn effect according to the present disclosure may further include an interface unit 11 used to select and input one of on and off of a function of realizing a virtual after-burn effect of a vehicle by a driver.

In the following description, a control subject is classified into the first controller 20 and the second controller 30, but a control procedure for realizing a virtual after-burn of a vehicle and a driving control procedure according to the present disclosure may also be performed by one integrated control element instead of a plurality of controllers.

A plurality of controllers and one integrated control element are collectively referred to as a controller, and the controller may perform a control procedure for realizing a virtual after-burn effect according to the present disclosure.

For example, the controller may collectively refer to the first controller 20, the second controller 30, a sound controller 51, and an emission controller 53 in the configuration according to the following embodiments.

The interface unit 11 may use any device for manipulating on and off of the function of realizing a virtual after-burn effect in the vehicle by a driver, and may be, for example, a manipulation device such as a button or a switch included in a vehicle, or an input device or a touchscreen of an audio, video, and navigation (ANV) system.

The interface unit 11 may be connected to the first controller 20, and in more detail, the first controller 20 may also be connected to a virtual after-burn realization controller 22 that will be described below.

Thus, in response to on or off manipulation of the driver through the interface unit 11, an on-signal or an off-signal may be input to the virtual after-burn realization controller 22 of the first controller 20 from the interface unit 11.

As a result, the virtual after-burn realization controller 22 of the first controller 20 may recognize an on or off-manipulation state of the function of realizing a virtual after-burn effect by the driver (refer to operation S1 of FIG. 3).

According to the present disclosure, after-burn sound and vibration due to after-burn while a vehicle travels, and the virtual after-burn effect realizing function for realizing a visual backfire effect may be performed only when the driver inputs an on-signal through the interface unit 11.

When the interface unit 11 is a vehicle input device included in a vehicle, on and off manipulation of the virtual after-burn effect realizing function may also be performed through a mobile device by the driver, as another example of the interface unit 11.

The mobile device needs to be connected to an in-vehicle device, for example, the first controller 20 to communicate therewith, and to this end, an input and output communication interface may be used for communication and connection between the mobile device and the first controller 20.

The driving information detector 12 may be a component for detecting vehicle driving information required to perform the virtual after-burn effect realizing function as well as the vehicle driving information required to generate the motor torque command in a vehicle.

According to an embodiment of the present disclosure, the driving information detector 12 may include an accelerator pedal detector for detecting an accelerator pedal input information (accelerator pedal input value) based on accelerator pedal manipulation of a driver, a speed detector for detecting a speed of a vehicle driving system, and a temperature detector for detecting the temperature of a PE part.

Here, the accelerator pedal detector may be a general accelerator position sensor (APS) installed in an accelerator pedal for outputting an electrical signal based on an accelerator pedal manipulation state of a driver.

The speed detector may acquire speed information of a vehicle driving system, and here, the speed information of the vehicle driving system may include one or two of speed and acceleration.

Here, the speed may be a rotation speed (motor speed) of a motor for driving the vehicle, that is, the driving motor 41, a rotation speed (wheel speed) of a vehicle wheel, or a rotation speed (drive shaft speed) of a drive shaft.

In this case, the speed detector may be a resolver installed in the driving motor 41 or a wheel-speed sensor installed in a vehicle wheel, or may be a sensor for detecting a drive shaft speed.

The acceleration may be obtained by differentiating a speed signal of the speed detector or may be an actually measured acceleration detected by an acceleration sensor as a speed detector.

The temperature detector may be used to detect the temperature of a PE part and may be a temperature sensor for detecting the temperature of a corresponding part, or may be a temperature sensor (water temperature sensor) for detecting the temperature of a coolant for cooling the component.

Here, the PE part may be the motor 41 for driving a vehicle, an inverter (not shown) for driving and controlling the motor, a battery (not shown) connected to the motor 41 to be charged and discharged through the inverter, or other PE parts related to motor driving, or a component of a driving system.

According to the present disclosure, the vehicle driving information may be used to generate a basic torque command by a basic torque command generator 21 that will be described below and may further include a vehicle speed.

In this case, although not shown in FIG. 2, the driving information detector 12 may further include a vehicle speed detector for detecting the current driving vehicle speed, and the vehicle speed detector may be a component including a wheel speed sensor installed in a driving wheel of a vehicle.

The first controller 20 may include the basic torque command generator 21 for generating a basic torque command from the vehicle driving information, the virtual after-burn realization controller 22 for generating a correction torque command (an intervention torque command for realizing virtual after-burn) for generating and realizing a motor vibration for realizing a virtual after-burn effect from the vehicle driving information, and a final torque command generator 23 for correcting the basic torque command to a correction torque command to generate the corrected final torque command.

The basic torque command may be a motor torque command that is determined and generated based on vehicle driving information collected while a general electric vehicle travels, and the basic torque command generator 21 may be a vehicle control unit (VCU) or a portion thereof for generating a motor torque command based on the vehicle driving information in the general electric vehicle.

In some forms of the present disclosure, the virtual after-burn realization controller 22 may be a new component for determining, generating, and outputting an intervention torque command for realizing a virtual after-burn effect that is a correction torque command only for realizing a virtual after-burn effect separately from the basic torque command, and may be added as a part of the VCU or may be configured as a control component separately from the VCU.

In some forms of the present disclosure, the virtual after-burn realization controller 22 may be a control component for performing overall control for realizing a virtual after-burn effect, may determine the characteristics of the virtual after-burn effect based on the vehicle driving information as well as may generate the correction torque command, and may control an operation of devices 52 and 54 for realizing the virtual after-burn effect according to the determined characteristics of the virtual after-burn effect.

The final torque command generator 23 may correct the basic torque command input from the basic torque command generator 21 based on the correction torque command input from the virtual after-burn realization controller 22, and may calculate a final torque command by adding an intervention torque command for realizing a virtual after-burn effect as a correction torque command, to the basic torque command.

The second controller 30 may be a controller for receiving a torque command transmitted from the first controller 20, that is, a final torque command determined by the final torque command generator 23 of the first controller 20 and controlling an operation of the driving device 41.

In some forms of the present disclosure, the driving device 41 may be a motor for driving a vehicle connected to a driving wheel 43, that is, the driving motor 41, and the second controller 30 may be a well-known motor control unit (MCU) for driving the motor 41 through an inverter and controlling driving of the motor 41 in a general electric vehicle.

In some forms of the present disclosure, an intervention torque command for realizing a virtual after-burn effect may provide a vibration for realizing virtual after-burn to torque of a motor as the driving device 41, and may realize a slight shake of motor torque matched with the characteristics of the virtual after-burn effect.

The intervention torque command for realizing a virtual after-burn effect may have a command value that changes in the form of waves having a predetermined period and amplitude.

The intervention torque command for realizing a virtual after-burn effect may have a command value that is associated with the characteristics of the virtual after-burn effect, and for example, may have a command value in the form of a pulse corresponding to the intensity, frequency, time duration, and time interval of the virtual after-burn effect of the characteristics of the virtual after-burn effect.

In some forms of the present disclosure, torque and rotation power output by a motor that is the driving device 41 may be reduced by a reducer 42 and may then be transferred to the driving wheel 43, as shown in FIG. 2, and in this regard, when driving of the motor 41 is controlled according to the corrected final torque command based on the aforementioned intervention torque command for realizing a virtual after-burn effect, motor torque to which a slight shake for realizing a virtual after-burn effect is added may be output.

The virtual after-burn realization controller 22 of the first controller 20 may determine the characteristics of the virtual after-burn effect based on vehicle driving information including at least one of an accelerator pedal input value, a change rate in the accelerator pedal input value (an inclination of an APS value), an integrated value of an accelerator pedal input value, motor torque, a change rate in motor torque (an inclination of motor torque), an integrated value of motor torque, speed of a driving system, and the temperature of a PE part (which is operation S2 in FIG. 3).

Here, the characteristics of the after-burn sound may include the time at which an after-burn sound is realized.

The characteristics of the after-burn sound may further include at least one of intensity, a frequency band or pitch (high and low of a sound), time duration, and a time interval as well as the time at which the after-burn sound is realized.

The virtual after-burn realization controller 22 of the first controller 20 may transfer information on the determined characteristics of the virtual after-burn effect to the sound controller 51 and the emission controller 53, and thus, the sound controller 51 and the emission controller 53 may check whether the current state is a normal state through a predetermined diagnosis logic for a sound device, the vibration device 52, and the light-emitting device 54 is a normal state (which is operation S3 in FIG. 3), respectively, and when the current state is the normal state, the sound controller 51 and the emission controller 53 may output a control signal for controlling an operation of these devices.

That is, the sound controller 51 may generate and output a sound control signal for playing and outputting a virtual after-burn sound in a vehicle from information on the characteristics of the virtual after-burn effect received from the virtual after-burn realization controller 22.

The sound controller 51 (or a separate vibration controller that is not shown) may generate and output a vibration control signal for generating a vibration matched with the characteristics of the virtual after-burn effect in a vehicle.

As a result, the virtual after-burn sound may be played and output by the sound device 52 while an operation of the sound device 52 is controlled according to the sound control signal output by the sound controller 51, and simultaneously, a vibration for realizing the virtual after-burn effect matched with the characteristics of the virtual after-burn effect may be generated by the vibration device 52 while an operation of the vibration device 52 is controlled according to a vibration control signal output by the sound controller 51 (which is operation S4 in FIG. 3).

In some forms of the present disclosure, the sound device 52 may include a speaker and a woofer that are installed at least one of the inside and the outside of the vehicle, and the vibration device 52 may be a vibration actuator installed to apply a vibration to a driver seat or a part of the vehicle around a driver seat.

The emission controller 53 may visually realize backfire, and may generate and output a light-emitting control signal for virtually realizing backfire from information on the characteristics of the virtual after-burn effect received from the virtual after-burn realization controller 22.

In this case, the emission controller 53 may output a light-emitting control signal for visually realizing a backfire effect associated with the characteristics of the virtual after-burn effect, and as a result, a visual effect mimicking backfire of an internal-combustion-engine vehicle may be realized through the light-emitting device 54 while an operation of the light-emitting device 54 is controlled according to the light-emitting control signal output by the emission controller 53 (which is operation S4 in FIG. 3).

In some forms of the present disclosure, the light-emitting device 54 may be installed outside the vehicle, may be installed inside the vehicle, which is visible to a driver, or may be installed both inside and outside the vehicle.

When installed outside the vehicle, the light-emitting device 54 may be installed at a rear end portion of the vehicle or may be installed both at the rear end portion and the front end portion of the vehicle, which may be a lamp assembly for mimicking a visual effect of backfire and may be any light-emitting device for visually realizing an effect of backfire.

In the following description, a method of determining the characteristics of a virtual after-burn effect by the virtual after-burn realization controller 22 of the first controller 20 and operations of the method will be described.

As described above, the characteristics of the virtual after-burn effect may include the time at which an after-burn effect is realized, and may further include at least one of intensity, a frequency, time duration, and a time interval.

The time at which an after-burn effect is realized will be described below.

1. Time of Realization

The most important characteristics of the virtual after-burn effect may be the time at which the virtual after-burn effect is realized.

The time at which the virtual after-burn effect is realized may be a factor for determining the time when realization of the virtual after-burn effect is initiated, for example, the time when output of the virtual after-burn sound is initiated.

The time at which the virtual after-burn effect is realized may be determined using various methods, and a list of available methods will be described below.

In the following description, an accelerator pedal input value detected by an accelerator pedal detector (APS) will be referred to as an APS value.

APS non-application may refer to an accelerator pedal-off state in which a driver does not depress an accelerator pedal, and APS application may refer to an accelerator pedal-on state in which the driver depresses an accelerator pedal.

In some forms of the present disclosure, the time at which the virtual after-burn effect is realized may be determined from accelerator pedal input information (APS value information) and motor torque, acquired from a signal of the accelerator pedal detector, and the temperature of a PE part. Here, the motor torque may be a motor torque command.

In some forms of the present disclosure, a controller (a virtual after-burn realization controller) may be set to determine the current time as the time at which the virtual after-burn effect is realized upon determining that at least one or a predetermined number of conditions are satisfied among the following realization conditions based on the accelerator pedal input information, the motor torque, and information on the temperature of the PE part.

When determining that the current time is the time at which the virtual after-burn effect is realized, the controller may start realizing the virtual after-burn effect such as output of a virtual after-burn sound.

1) With Regard to APS Value
   In the case of APS non-application
   When an APS value is less than a first setting value
   When a previous state is APS application but the current state is APS non-application
   When an APS value is a higher value than a first upper setting value at a previous time but is equal to or less than the first upper setting value at the current time
   When an APS value is recorded as a higher value than a first setting value and then an APS non-application state occurs
   When an APS value is recorded as a higher value than a first upper setting value and then is recorded as a lower value than a first lower setting value
   When an inclination of an APS value is a negative (−) value
   When an inclination of an APS value is equal to or less than a second setting value
   When an APS value is recorded as a higher value than a second setting value and then an inclination of an APS value is equal to or less than a second setting value
   When an integrated value of an APS value (a forgetting factor or anti-windup is applicable) is equal to or less than a third setting value
   When the integrated value of the APS value is recorded as a higher value than a second upper setting value and then is recorded as a lower value than a second lower setting value.

In the aforementioned case, the after-burn effect is realized in the APS non-application state because an after-burn sound is generally realized immediately when acceleration is stopped and an after-burn sound is generated when a non-combusted mixer flows in an exhaust pipe and explodes according to a generating principle.

2) With Regard to Motor Torque (Motor Torque Command)
   In the case of motor torque≤0
   When motor torque is a lower value than a fourth setting value
   When motor torque>0 at a previous time but motor torque≤0 at the current time
   When motor torque is a higher value than a third upper setting value at a previous time but is equal to or less than the third upper setting value at the current time
   When motor torque is recorded as a higher value than a fourth setting value and then becomes in the state of motor torque≤0
   When motor torque is recorded as a higher value than a third upper setting value and then is recorded as a lower value than a third lower setting value
   When a change rate (inclination) of motor torque is a negative (−) value
   When a change rate (inclination) of motor torque is equal to or less than a fifth setting value
   When motor torque is recorded as a higher value than a fourth setting value and then a change rate (inclination) of motor torque is equal to or less than a fifth setting value
   When an integrated value of motor torque (a forgetting factor or an anti-windup is applicable) is equal to or less than a sixth setting value
   When an integrated value of motor torque is recorded as a higher value than a fourth upper setting value and then is recorded as a lower value than a fourth lower setting value 3) With Regard to Temperature of Power Electronic (PE) Part
   When the temperature of a motor, the temperature of a battery, or the temperature of other predetermined PE parts related to motor driving (which is the temperature of a coolant) is within a temperature range of a preset realization condition In some forms of the present disclosure, when determining that the condition is satisfied and that the current time is the time at which a virtual after-burn effect is realized, a controller (a virtual after-burn realization controller) may be set to realize the virtual after-burn effect only at the time at which the after-burn effect is realized or to continuously realize the after-burn effect for a predetermined time based on the time at which the after-burn effect is realized.

As a condition for determining that the current time is the time at which the after-burn effect is realized, only some predetermined conditions instead of the entirety of the conditions of the list may be selectively applied to the controller.

In this case, the controller may be set to determine that the current time is the time at which the after-burn effect is realized when all the applied conditions are satisfied (the condition AND is applied).

The controller may be set to determine that the current time is the time at which the after-burn effect is realized when a predetermined number of some conditions are simultaneously satisfied among the applied conditions.

When one of the applied conditions is satisfied (the condition OR is applied), the controller may be set to determine that the current time is the time at which the after-burn effect is realized.

Delay of realization for a predetermined time, a debouncing condition of setting conditions, or the like may be applied, and signal correction may also be performed by changing a setting value to a function of other parameters.

In addition, the condition of determining the time at which the after-burn effect is realized may not be limited to only the list, and as necessary, a condition may be changed and added.

2. Intensity

As a factor for determining the intensity of the virtual after-burn effect, the intensity may be the volume when the virtual after-burn effect is realized in the form of a sound, and the intensity may be illumination when the virtual after-burn effect is realized in the form of luminescence.

When the virtual after-burn effect is realized in the form of vibration, the intensity may be vibration amplitude, and for example, in the case of vibration in the form of pulse, the intensity may be pulse amplitude, and in the case of vibration of a motor, the intensity may be associated with the amount of applied torque.

In order to ensure the sense of reality of realizing the virtual after-burn effect, it may be required to appropriately adjust the intensity depending on the cases, and a list of methods to be applied to adjust the intensity will be described below.

1) Connection with Speed of Driving System

The intensity may be adjusted depending on speed of the driving system, in which case the speed of the driving system may be a motor speed, a wheel speed, or a drive shaft speed.

In general, considering that the intensity of after-burn is increased when a low stage of an internal-combustion-engine vehicle is used, the intensity may be set to decay (weaken) as the speed is increased.

On the other hand, the intensity may be set to increase (strengthen) as the speed is increased in order to ensure the consistency of the amount of recognition of the after-burn effect even if driving noise is present.

2) Connection with Acceleration

As an acceleration value of a driving system, obtained based on estimation through a speed signal of the driving system or through a signal of an acceleration sensor, is increased, the intensity of the virtual after-burn effect may be set to be increased.

3) Connection with Integrated Value of Acceleration

The integrated value of acceleration of the driving system may refer to speed, but, when an acceleration signal is processed and integrated, a significant signal may be generated.

For example, the intensity of the after-burn effect may be set to use only a positive (+) value of acceleration and to associate the positive (+) value of acceleration with an integrated value, in which case the intensity is increased as the integrated value is increased.

Here, in order to prevent the integrated value from diverging, it may be possible to apply a forgetting factor or an anti-windup, and the acceleration obtained based on estimation through a speed signal of a driving system or through a signal of an acceleration sensor may be used.

4) Connection with APS Value

The intensity may be set to be associated with the APS value or the associated APS value, in which case the processed APS value may refer to a value obtained by applying a time delay, a rate limit, a filter, or the like to the APS signal and processing the result.

It may be possible to select, process, and then use some or all of APS values recorded within a predetermined past time.

According to the present disclosure, as the APS value is increased, the intensity may be set to have a higher value.

5) Connection with Inclination of APS Value

As an inclination of lowering an APS value is increased, the intensity may be set to have a higher value. The inclination of the APS value may also be a value processed using the same method like in the APS value.

6) Connection with Integrated Value of APS Value

It may be possible to apply connection with the integrated value of the APS value instead of the aforementioned integrated value of acceleration, and the intensity of the virtual after-burn effect may be set to be associated with the integrated value of the APS value.

The same method as the aforementioned method of connection with the integrated value of the acceleration may be applied to connection of the integrated value of the APS value using the same method as the aforementioned method of connection with the integrated value of the acceleration.

7) Connection with Motor Torque (Motor Torque Command)

It may be possible to apply connection with the motor torque (motor torque command) instead of the aforementioned connection with the APS value, and the intensity of the virtual after-burn effect may be set to be associated with the motor torque.

The same method as the aforementioned method of connection with the APS value may be applied to connection of the intensity with the motor torque.

8) Connection with Inclination of Motor Torque (Motor Torque Command)

It may be possible to apply connection with the inclination of the motor torque (motor torque command) instead of the aforementioned connection with the inclination of the APS value, and the intensity of the virtual after-burn effect may be set to be associated with the inclination of the motor torque.

The same method as the aforementioned method of connection with the inclination of the APS value may be applied to connection of the intensity with the inclination of the motor torque.

9) Connection with Integrated Value of Motor Torque (Motor Torque Command)

It may be possible to apply connection with the integrated value of the motor torque (motor torque command) instead of the aforementioned connection with the integrated value of the acceleration, and the intensity of the virtual after-burn effect may be set to be associated with the integrated value of the motor torque.

The same method as the aforementioned method of connection with the integrated value of the acceleration may be applied to connection of the intensity with the integrated value of the motor torque.

10) Adjustment of Intensity Depending on Temperature of Power Electronic (PE) Part When the temperature of the PE part is within a setting range, the intensity may be set to have a high value (intensity strengthening), and when the temperature of the PE part is outside the setting range, the intensity may be set to have a lower value than in the case in which the temperature of the PE part is within the setting range (intensity weakening).

This may be required to make the after-burn effect insignificant because a mixer is not combusted in an exhaust pipe when the exhaust temperature of an actual internal combustion engine is too low and to prevent after-burn through protection control when the exhaust temperature of the internal combustion engine is too high.

In addition, while the state in which the temperature of the PE part is within a setting range or is outside the setting range is maintained, the intensity may be set to gradually decay.

Thus far, the method of determining the intensity of the virtual after-burn effect has been described, and one or two or more selected among the aforementioned methods may be applied.

3. Frequency

When the virtual after-burn effect is realized in the form of a sound, a frequency (a frequency band or a pitch) which is high and low of the sound, and it may be possible to set a frequency using the same connection method with respect to the same input parameter used for the aforementioned intensity setting.

4. Time Duration

The time duration after the virtual after-burn effect is realized may be set, and it may be possible to set the time duration using the same connection method with respect to the same input parameter used for the aforementioned intensity setting.

5. Time Interval

The after-burn effect may be realized in the impulsive form, and may be generally generated simultaneously and continuously during a predetermined time duration.

In this case, a time interval between the continuously generated after-burn effects may be set.

It may also be possible to set the time interval using the same connection method with respect to the same input parameter used for the aforementioned intensity setting.

Figure 4:
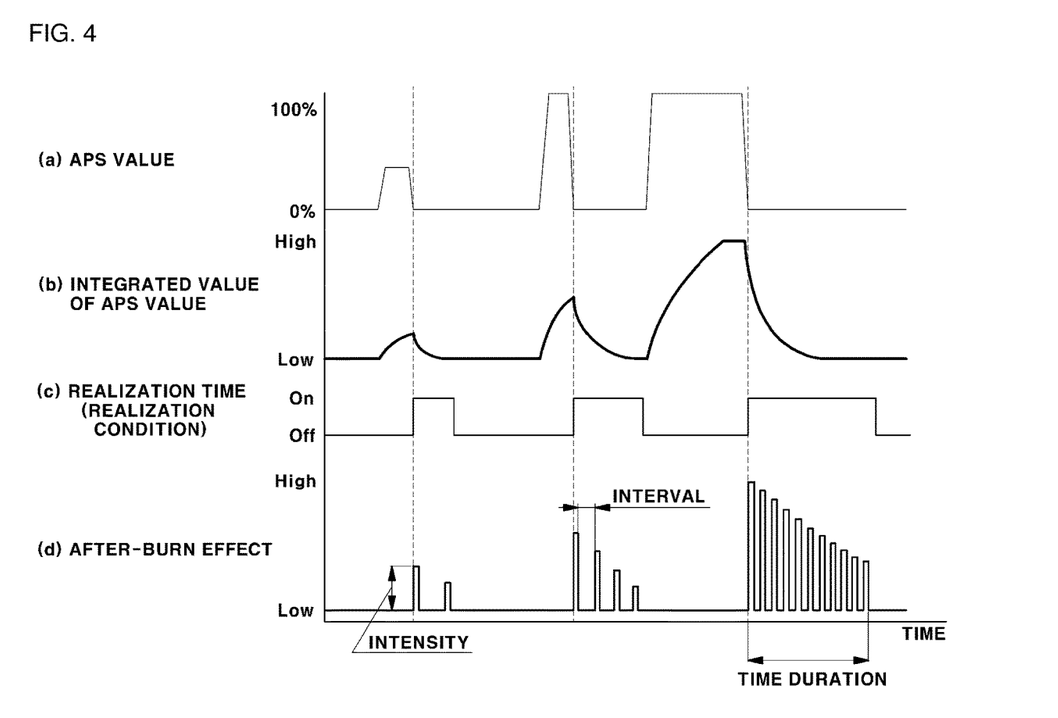
FIG. 4 is a diagram showing an example of an input parameter and the characteristics of a virtual after-burn effect in one form of the present disclosure.

FIG. 4 is a diagram showing an example of an input parameter and the characteristics of a virtual after-burn effect in some forms of the present disclosure.

As seen from FIG. 4, a condition for realizing the virtual after-burn effect may be satisfied when an APS value is reduced by a predetermined width and the time at which realization of the virtual after-burn effect is initiated, and even if there is the same drop from 'A' to 'B', an integrated value of the APS value is changed depending on an accumulated time of APS application, and thus the intensity, the time duration, the interval, or the like may be changed.

In an example of FIG. 4, the intensity, the time direction, the interval, or the like may be determined depending on the integrated value of the APS value.

Accordingly, the apparatus and method of realizing a virtual after-burn effect in an electric vehicle according to the present disclosure may virtualize an after-burn effect including an after-burn sound, backfire, and vibration in an internal-combustion-engine electric vehicle in the electric vehicle, and thus dynamic sport driving sensation and excitement that a driver experiences only in a high-performance vehicle may be provided to the driver, the commercial value of the vehicle may be improved, and the vehicle may be differentiated.

In particular, the apparatus and method of realizing a virtual after-burn effect in an electric vehicle according to the present disclosure may provide a virtual after-burn effect that a driver experiences excitement and fun driving in their vehicle without a change in the vehicle by avoiding the characteristics of only the electric vehicle, which is boring, when the driver wants fun driving.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A method of realizing a virtual after-burn effect in an electric vehicle, the method comprising:
   receiving, at a controller, vehicle driving information while the electric vehicle travels;
   determining, by the controller, characteristics of the virtual after-burn effect based on the vehicle driving information;
   outputting, by the controller, a control signal for realizing the virtual after-burn effect based on the determined characteristics of the virtual after-burn effect;
   controlling, by the controller, an operation of a realization device for realizing the virtual after-burn effect according to the control signal;
   determining, by the controller, a basic torque command based on the vehicle driving information collected from the electric vehicle while the electric vehicle travels;
   determining, by the controller, a correction torque command for generating and realizing vibration of a motor for realizing the virtual after-burn effect based on the vehicle driving information;
   determining and generating, by the controller, a final motor torque command obtained by correcting the determined basic torque command to the determined correction torque command; and
   controlling, by the controller, an operation of the motor for driving the electric vehicle based on the generated final motor torque command.

2. The method of claim 1, wherein the characteristics of the virtual after-burn effect comprise a time when realization of the virtual after-burn effect is initiated through the realization device.

3. The method of claim 2,
   wherein the virtual after-burn effect comprises a sound played and output by a sound device that mimics an after-burn sound of an internal-combustion-engine vehicle, and
   wherein the characteristics of the virtual after-burn effect further comprise at least one of intensity, time duration, a time interval, and a frequency band of the sound, or a pitch indicating high and low of the sound.

4. The method of claim 2,
   wherein the virtual after-burn effect comprises an effect of vibration generated by a vibration device that mimics vibration of an internal-combustion-engine vehicle due to after-burn in the internal-combustion-engine vehicle, and
   wherein the characteristics of the virtual after-burn effect further comprise at least one of intensity, frequency, time duration, or a time interval of the vibration mimicking the vibration of the internal-combustion-engine vehicle due to the after-burn.

5. The method of claim 2,
   wherein the virtual after-burn effect comprises an effect of light-emitting generated by a light-emitting device that mimics backfire due to after-burn of an internal-combustion-engine vehicle, and
   wherein the characteristics of the virtual after-burn effect further comprise at least one of intensity, frequency, time duration, or a time interval of light emission mimicking the backfire due to the after-burn.

6. The method of claim 1, wherein the vehicle driving information comprises at least one of an accelerator position sensor (APS) value indicating an input value of a driver accelerator pedal, an inclination of the APS value, an integrated value of the APS value, a motor torque command, an inclination of the motor torque command, an integrated value of the motor torque command, information on a speed of a driving system, or temperature of a power electronic (PE) part.

7. The method of claim 6, wherein the information on the speed of the driving system comprises at least one of a motor speed and a motor acceleration, an integrated value of the motor acceleration, a wheel speed and a wheel acceleration, an integrated value of the wheel acceleration, a drive shaft speed and a drive shaft acceleration, or an integrated value of the drive shaft acceleration.

8. The method of claim 6, wherein the temperature of the PE part comprises at least one of temperature of the motor, temperature of a battery, or temperature of other PE parts related to motor driving.

9. An apparatus for realizing a virtual after-burn effect in an electric vehicle, the apparatus comprising:
 a driving information detector configured to detect vehicle driving information while the electric vehicle travels;
 a controller configured to:
  determine characteristics of the virtual after-burn effect based on the vehicle driving information; and
  output a control signal for realizing the virtual after-burn effect based on the determined characteristics of the virtual after-burn effect; and
 a realization device installed in the electric vehicle and configured to control an operation to realize the virtual after-burn effect according to the control signal,
 wherein the controller comprises:
  a basic torque command generator configured to determine a basic torque command based on the vehicle driving information while the electric vehicle travels;
  a virtual after-burn realization controller configured to generate a correction torque command for generating and realizing vibration of a motor to realize the virtual after-burn effect based on the determined characteristics of the virtual after-burn effect; and
  a final torque command generator configured to generate a final motor torque command by correcting the determined basic torque command to the determined correction torque command, and
 wherein the controller is further configured to control an operation of the motor for driving the electric vehicle according to the final motor torque command.

10. The apparatus of claim 9, wherein the characteristics of the virtual after-burn effect comprise a time when realization of the virtual after-burn effect is initiated through the realization device.

11. The apparatus of claim 10,
 wherein the realization device is a sound device,
 wherein the virtual after-burn effect is a sound played and output by the sound device that mimics an after-burn sound of an internal-combustion-engine vehicle, and
 wherein the characteristics of the virtual after-burn effect further comprise at least one of intensity, time duration, a time interval, and a frequency band of the sound, or a pitch indicating high and low of the sound.

12. The apparatus of claim 10,
 wherein the realization device is a vibration device,
 wherein the virtual after-burn effect comprises an effect of vibration generated by the vibration device that mimics vibration of an internal-combustion-engine vehicle due to after-burn in the internal-combustion-engine vehicle, and
 wherein the characteristics of the virtual after-burn effect further comprise at least one of intensity, frequency, time duration, or a time interval of the vibration mimicking the vibration of the internal-combustion-engine vehicle due to the after-burn.

13. The apparatus of claim 10,
 wherein the realization device is a light-emitting device,
 wherein the virtual after-burn effect is an effect of light-emitting generated by the light-emitting device that mimics backfire due to after-burn of an internal-combustion-engine vehicle, and
 wherein the characteristics of the virtual after-burn effect further comprise at least one of intensity, frequency, time duration, or a time interval of light emission mimicking the backfire due to the after-burn.

14. The apparatus of claim 10, wherein the vehicle driving information comprises at least one of an accelerator position sensor (APS) value indicating an input value of a driver accelerator pedal, an inclination of the APS value, an integrated value of the APS value, a motor torque command, an inclination of the motor torque command, an integrated value of the motor torque command, information on a speed of a driving system, or temperature of a power electronic (PE) part.

15. The apparatus of claim 14, wherein the information on the speed of the driving system comprises at least one of a motor speed and a motor acceleration, an integrated value of the motor acceleration, a wheel speed and a wheel acceleration, an integrated value of the wheel acceleration, a drive shaft speed and a drive shaft acceleration, or an integrated value of the drive shaft acceleration.

16. The apparatus of claim 14, wherein the temperature of the PE part comprises at least one of temperature of the motor, temperature of a battery, or temperature of other PE parts related to motor driving.

* * * * *